S. F. SEASHOLTZ.
INSECT TRAP.
APPLICATION FILED JUNE 8, 1915.
1,200,993.
Patented Oct. 10, 1916.
2 SHEETS—SHEET 1.
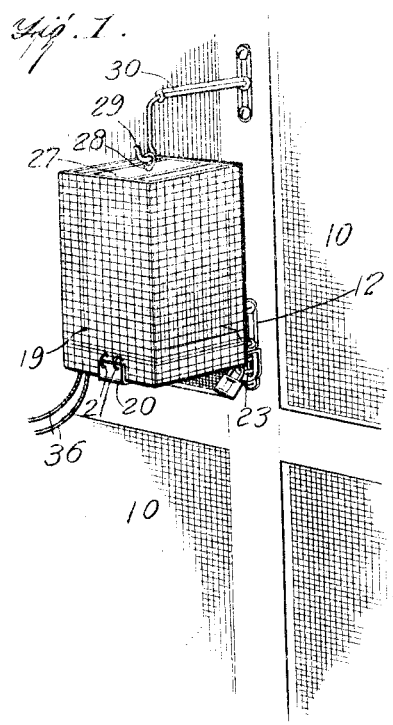
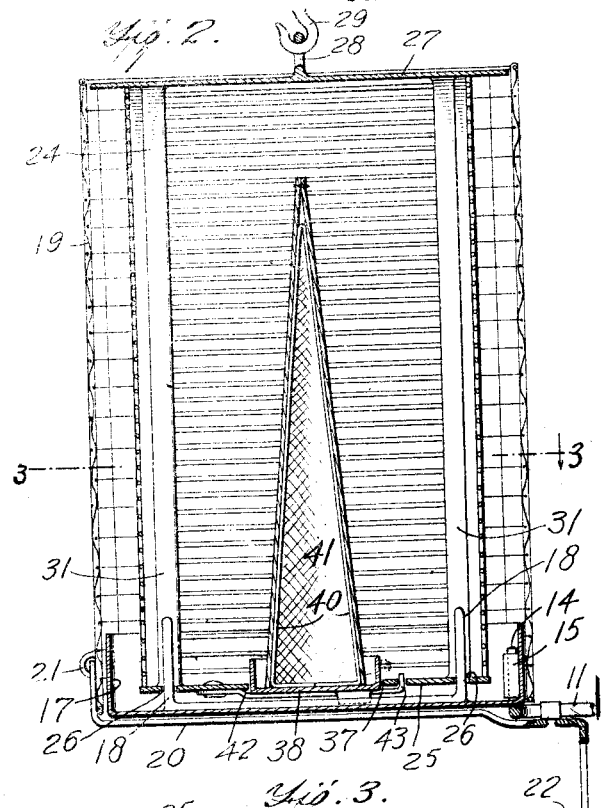
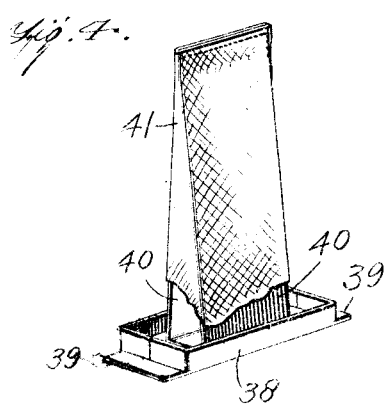
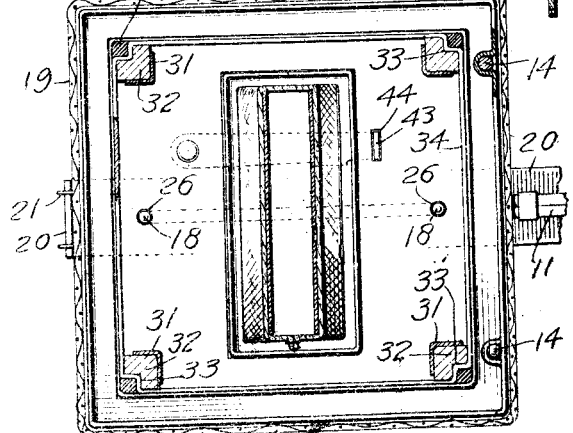
WITNESSES:
INVENTOR
Sylvanus F. Seasholtz,
BY Munn & Co.
ATTORNEYS

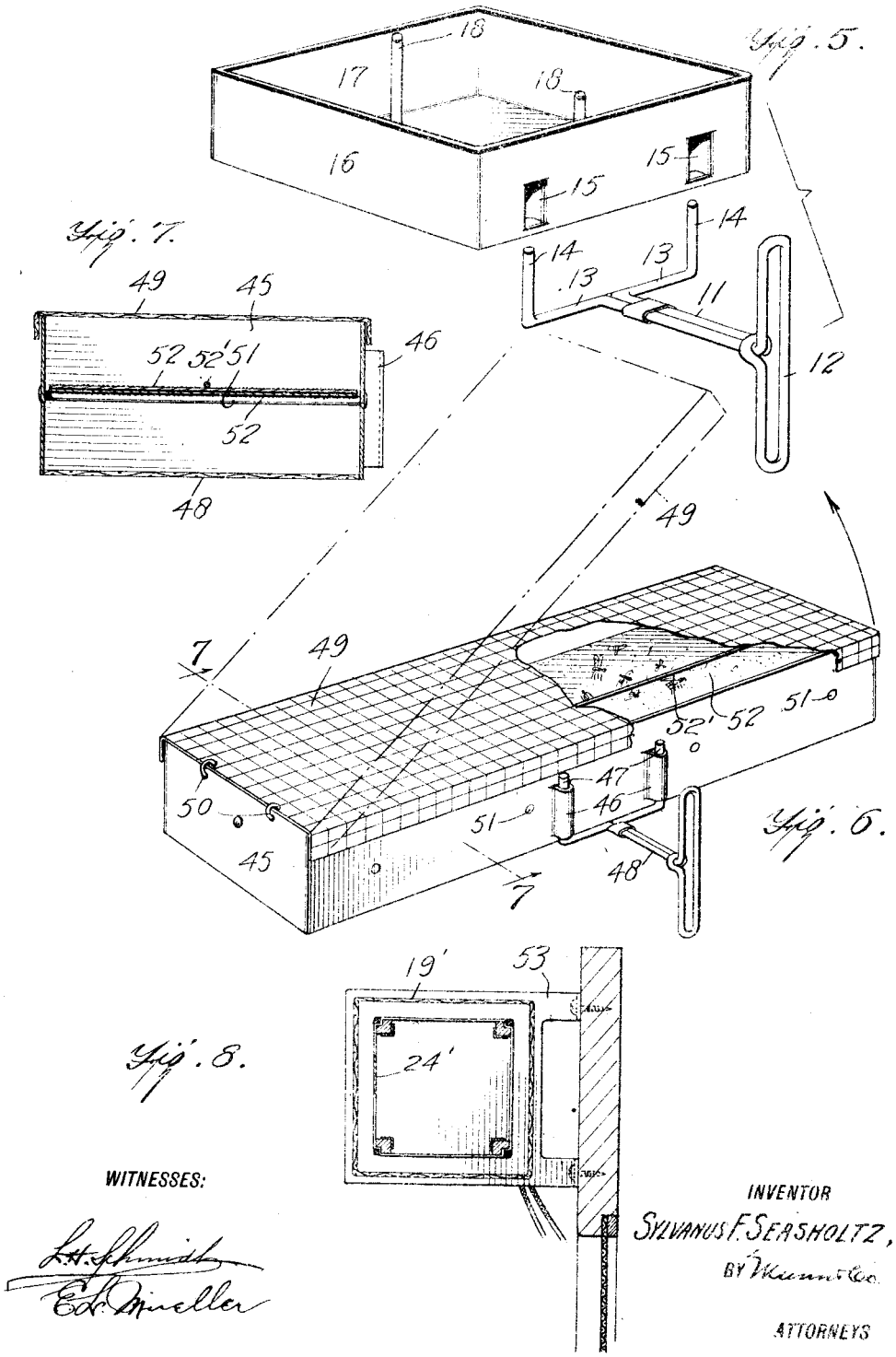

UNITED STATES PATENT OFFICE.

SYLVANUS FOX SEASHOLTZ, OF POCATELLO, IDAHO.

INSECT-TRAP.

1,200,993.  Specification of Letters Patent.  Patented Oct. 10, 1916.

Application filed June 8, 1915. Serial No. 32,873.

*To all whom it may concern:*

Be it known that I, SYLVANUS F. SEASHOLTZ, a citizen of the United States, and a resident of Pocatello, in the county of Bannock and State of Idaho, have invented an Improvement in Insect-Traps, of which the following is a specification.

This invention is an improvement in insect traps and has particular reference to a trap adapted to be attached to doors, windows and the like.

One of the objects of the present invention is to provide a plurality of lengths of electrically charged wire which are disposed adjacent and parallel to each other in such manner that the insects will be electrocuted by completing a normally open circuit that is maintained, the current bridging the adjacent wires through the body of the insect that comes into contact therewith.

Another object of the invention is to provide a device of this character which is comparatively simple in construction, effective in use, and which may be manufactured at a minimum cost.

The inventive idea involved is capable of receiving a variety of mechanical expressions, some of which, for the purpose of illustrating the invention, are shown in the accompanying drawings, in which—

Figure 1 is a perspective view of a preferred embodiment of the invention showing the same applied to a screen door. Fig. 2 is an enlarged vertical sectional view thereof. Fig. 3 is a transverse section on the line 3—3 of Fig. 2. Fig. 4 is a detail perspective view of a bait device used in connection with the invention. Fig. 5 is a detail perspective view of the bottom receptacle used in connection with the invention and the means for securing the same to a support. Fig. 6 is a perspective view of a modified form of the invention. Fig. 7 is a transverse view on the line 7—7 of Fig. 6. Fig. 8 is a still further modification showing the electric wire supporting frame in horizontal position.

Referring to the drawings and more particularly to Figs. 1 to 5 inclusive thereof the numeral 10 indicates a screen door to which is adapted to be attached a wire bracket generally indicated by 11. This bracket is bent to provide a vertical portion 12 forming a slot adapted to receive suitable fastening means such as screws. The ends 13 of the bracket are bent laterally as shown best in Fig. 5 and are provided with the vertical portions 14 adapted for insertion into the sockets 15 of the bottom tray or receptacle 16 whereby the same is supported in a substantially horizontal position as shown in Fig. 2. This receptacle 16 is provided around its top with an inturned flange 17 and has extending upwardly from the bottom thereof the vertical guides 18 for a purpose which will appear in the course of this description. A fluid may be placed in this receptacle 16 so that insects dropping thereinto will be drowned, or a piece of fly paper may be placed therein in order to prevent the escape of the insects.

The outer frame 19 formed of wire mesh is adapted to surround the receptacle 16 and is provided with a hasp 20 pivoted thereto at 21, said hasp extending under the receptacle 16 and being provided at its other end with a slotted extension 22 adapted to receive a staple 23 whereby the frame may be locked to the door, as shown in Fig. 1.

An inner wire supporting frame generally indicated by the numeral 24 is mounted within the outer wire frame 19 and has its bottom 25 provided with openings 26 to receive the upright guides 18. The frame 24 is also provided with a top 27 which is provided with an eye 28 adapted to receive the hook portion 29 of a bracket 30 which may be secured to the screen door 10 as shown in Fig. 1 whereby the frame is supported in position. The top and bottom of the frame are connected by means of vertical metallic strips 31, angular in cross section, and adapted to engage certain edges of wooden posts 32 which are of substantially rectangular form. Each post 32 is cut away on the edge diagonally opposite to the one engaging the metallic strip to provide the longitudinally extending groove 33.

A plurality of positive and negative electrically charged wires 34 are wound about the posts 32 and are crimped into the groove 33, as shown in Fig. 3 so as to tighten the same and prevent sagging thereof, the same being secured in spaced relation by means of suitable insulation 35. The terminals 36 of the wires 34 are connected to any suitable source of current, not shown, whereby said wires may be charged in order to electrocute the insects, the latter completing a normally open circuit by bridging the adjacent wires with which they come in contact. The inner frame 24 is inserted into the receptacle 16 and is spaced from the flange 17 thereof in order that the insects, after being electrocuted, will drop into said receptacle.

A bait device is used in connection with the invention and is mounted in a rectangular opening 37 formed in the bottom 25 of the frame 24. This bait device comprises a small pan 38 having extensions 39 at the bottom thereof adapted for engagement with the bottom 25 of the frame and also has extending upwardly from its bottom the converging plates 40 surrounded by a cover 41 of some absorbent material which may be saturated with a liquid adapted to attract the insects. This bait device is detachably retained in position by means of a pivoted latch 42 which extends underneath of the pan 38 and has its free end provided with a lateral extension 43 adapted for engagement with a slot 44 formed in the bottom 25 of the inner frame. It will thus be seen that should it be desired to remove the bait device, this may be done by first lifting the inner frame out of the surrounding frame 19 and then disengaging the latch 42 from the pan 38 whereupon the device may be removed from the opening 37 formed centrally in the bottom 25 of the inner frame.

In the modification shown in Figs. 6 and 7 the trap comprises a metallic frame 45, preferably rectangular in formation, and having struck in the sides thereof the spaced sockets 46 adapted to receive the vertical portion 47 of a bracket 48 which is identical in construction to the bracket 11 used in connection with the preferred embodiment. The frame 45 has secured thereto a fixed bottom 48 of wire mesh and is also provided with a wire mesh top 49 hinged to the frame 45 at 50. Said frame has extending transversely thereof a plurality of spaced alined supporting rods 51 adapted to have secured thereto the sheets of "fly paper" 52. These sheets of "fly paper" are substituted for the electrical entrapping device which is used in connection with the construction shown in Figs. 1 to 5. A rod 52' extending longitudinally of the frame 45 is adapted to retain the sheets 52 in position.

In Fig. 8, there is shown a slight modification of the form shown in Fig. 1, wherein the device is constructed so as to be better adapted to be applied to a screen. The outer and inner frames 19' and 24', respectively, in this instance, are arranged in horizontal position and supported by means of the brackets 53 at each end thereof. The inner frame 24' is also identical in construction to the inner frame 24 in the preferred embodiment.

I claim:—
1. An apparatus of the class described comprising a receptacle having guides extending therefrom, an outer wire mesh frame surrounding said receptacle, an inner frame including end plates and mounted in said receptacle, one of said plates having openings for receiving the guides carried by said receptacle, posts interposed between said end plates and having grooves therein, electrically charged wires surrounding said posts and crimped to engage said grooves, means for retaining said wires in position, and a bait device mounted in said inner frame.

2. An apparatus of the character described comprising a frame including longitudinal members having grooves therein, electrically charged wires surrounding said frame and crimped to engage said grooves, means for retaining said wires in position, a wire mesh frame surrounding the first-named frame, and a receptacle having its sides interposed between said frames and spaced from the first-named frame.

3. An apparatus of the character described comprising an inner frame, insect destroying means carried thereby, an outer frame surrounding said inner frame, and a receptacle having its bottom arranged beneath both frames and its sides interposed therebetween and spaced from the inner frame.

4. An apparatus of the character described comprising an inner frame, insect destroying means carried thereby, an outer frame surrounding said inner frame, a receptacle having its bottom arranged beneath both frames and its sides interposed therebetween and spaced from the inner frame, and guides for said inner frame carried by said receptacle.

5. An apparatus of the character described, comprising a receptacle having spaced guides extending therefrom, a frame provided with an end plate having openings for receiving said guides, and electrically charged wires carried by said frame.

6. An apparatus of the character described, comprising a frame including rectangular longitudinal members having longitudinal grooves in their outer edges, electrically charged wires surrounding said frame and crimped to engage said grooves, and means for retaining said wires in position.

SYLVANUS FOX SEASHOLTZ.

Witnesses
D. W. Church,
T. D. Franklin.